(12) United States Patent
Helder et al.

(10) Patent No.: US 6,933,459 B2
(45) Date of Patent: Aug. 23, 2005

(54) METHODS AND APPARATUS FOR FABRICATING A TURBINE ENGINE BLADE

(75) Inventors: Earl Claude Helder, Cincinnati, OH (US); Timothy Dion Riggs, Madisonville, KY (US); Mark Lawrence Hunt, Greenwood, SC (US); Daniel Jacob Goertzen, Madisonville, KY (US); Robert John Heeg, Cincinnati, OH (US); Wendy Howard Murphy, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 111 days.

(21) Appl. No.: 10/357,099

(22) Filed: Feb. 3, 2003

(65) Prior Publication Data

US 2004/0149696 A1 Aug. 5, 2004

(51) Int. Cl.[7] .................. B23K 11/02; B23K 11/14; B23P 15/04
(52) U.S. Cl. ............... 219/117.1; 219/93; 29/889.22; 29/889.721
(58) Field of Search ............... 219/117.1, 93, 219/102; 29/889.21, 889.22, 889.7, 889.71, 889.72, 889.721

(56) References Cited

U.S. PATENT DOCUMENTS

| 4,236,870 | A | * | 12/1980 | Hucul et al. ............... 416/97 R |
| 4,795,876 | A | * | 1/1989 | Nustede et al. ............ 219/86.1 |
| 5,132,502 | A | * | 7/1992 | Caruana et al. .......... 219/117.1 |
| 5,365,663 | A | * | 11/1994 | Demartini ................ 29/889.21 |
| 5,403,156 | A | * | 4/1995 | Arness et al. ............. 416/96 R |
| 5,544,873 | A | | 8/1996 | Vickers et al. |
| 5,813,593 | A | | 9/1998 | Galaske, Jr. |
| 5,822,852 | A | * | 10/1998 | Bewlay et al. ............. 29/889.1 |
| 5,847,350 | A | | 12/1998 | Dorrel et al. |
| 6,131,800 | A | * | 10/2000 | Fernihough et al. ........ 228/212 |
| 6,158,104 | A | | 12/2000 | Roberts et al. |
| 6,186,741 | B1 | * | 2/2001 | Webb et al. ............... 416/96 R |
| 6,302,649 | B1 | * | 10/2001 | Mukira et al. ............. 415/200 |
| 6,438,838 | B1 | * | 8/2002 | Meier et al. .............. 29/889.1 |
| 6,491,496 | B2 | * | 12/2002 | Starkweather ............ 416/97 R |
| 6,565,680 | B1 | * | 5/2003 | Jackson et al. ............. 148/428 |
| 6,648,596 | B1 | * | 11/2003 | Grylls et al. ................ 415/200 |

FOREIGN PATENT DOCUMENTS

| FR | 2 226 241 | * 11/1974 | ............ B23K/9/02 |
| GB | 2 225 063 | * 5/1990 | ............. F01D/5/08 |

* cited by examiner

*Primary Examiner*—Kevin P. Kerns
(74) *Attorney, Agent, or Firm*—William Scott Andes; Armstrong Teasdale LLP (57) ABSTRACT

A method for fabricating a turbine engine blade. The method includes providing a resistance welding system, and welding a metering plate to the turbine engine blade using the resistance welding system.

17 Claims, 7 Drawing Sheets

METHODS AND APPARATUS FOR FABRICATING A TURBINE ENGINE BLADE

BACKGROUND OF THE INVENTION

This invention relates generally to gas turbine engines, and more specifically to a method and apparatus for coupling a metering plate to a turbine engine blade.

Gas turbine engines typically include a compressor, a combustor, and at least one turbine. The compressor compresses air which is then channeled to the combustor. The compressed air is mixed with fuel and ignited within the combustor to generate combustion gases which are channeled to the turbine. The turbine extracts energy from the combustion gases to power the compressor, as well as to produce useful work to propel an aircraft in flight or to power a load, such as an electrical generator.

The turbine typically includes a rotor assembly and a stator assembly. The rotor assembly may include a plurality of rotor blades extending radially outward from a disk. The stator assembly may include a plurality of stator vanes which form a nozzle for directing combustion gases entering the turbine to the rotor blades.

During operation, the turbine stator and rotor assemblies are exposed to combustion gases. Over time, continued exposure to combustion gases may increase an operating temperature of the rotor and stator assemblies. To facilitate reducing operating temperatures, at least some known stator and rotor assemblies channel cooling fluid to radial passages defined within the rotor blades and/or stator vanes. More specifically, at least some known rotor blades and/or stator vanes may include metering plates coupled to an end of each blade and/or vane which partially cover openings to the radial passages to facilitate control of airflow into the radial passages. At least some known methods for coupling the metering plates to the rotor blades and/or stator blades include vacuum furnace brazing a plurality of blades and/or vanes simultaneously. However, such a coupling method may be costly and time-consuming.

BRIEF DESCRIPTION OF THE INVENTION

In one aspect, a method is provided for fabricating a turbine engine blade. The method includes providing a resistance welding system, and welding a metering plate to the turbine engine blade using the resistance welding system.

In another aspect, a method is provided for coupling a metering plate to a turbine engine blade that includes at least one cooling passage therein. The method includes providing a resistance welding system, and welding the metering plate to the turbine engine blade using the resistance welding system such that the metering plate at least partially covers an entrance to the at least one cooling passage.

In yet another aspect, a method is provided for coupling a component to a turbine engine stator vane. The method includes providing a resistance welding system, and welding the component to the turbine engine stator vane using the resistance welding system.

DETAILED DESCRIPTION OF THE INVENTION

As used herein, the term "component" may include any component configured to be coupled with a gas turbine rotor blade and/or stator vane using a resistance welding process, for example, a metering plate. A metering plate is intended as exemplary only, and thus is not intended to limit in any way the definition and/or meaning of the term "component". Furthermore, although the invention is described herein in association with a gas turbine engine blade, and more specifically for use with a turbine rotor blade for a gas turbine engine, it should be understood that the present invention is applicable to gas turbine engine stator vanes and other gas turbine engine blades. Accordingly, practice of the present invention is not limited to turbine rotor blades for gas turbine engines. In addition, although the invention is described herein in association with a resistance projection welding process, it should be understood that the present invention may be applicable to any resistance welding process, for example, resistance spot welding and resistance seam welding processes. Accordingly, practice of the present invention is not limited to resistance projection welding.

Figure 1:
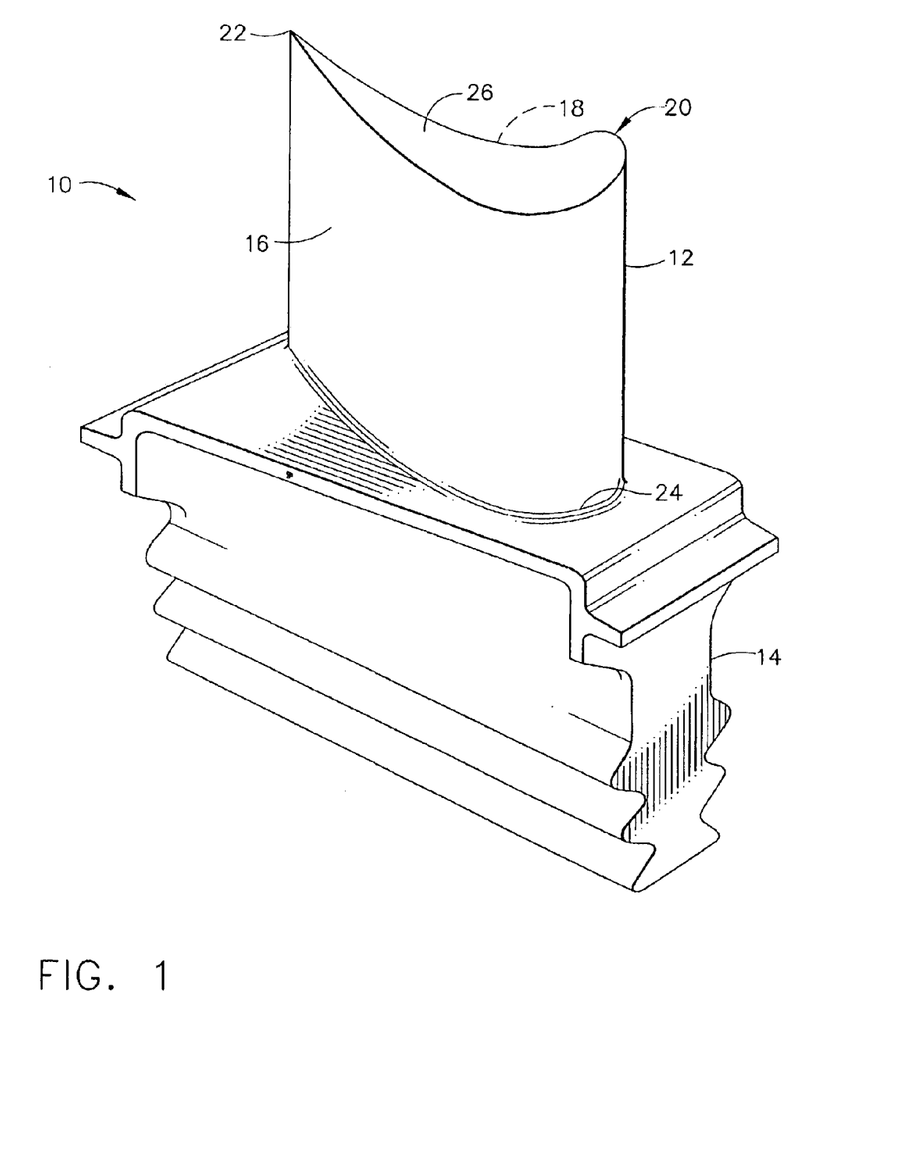
FIG. 1 is a perspective view of an exemplary gas turbine engine blade.
Figure 2:
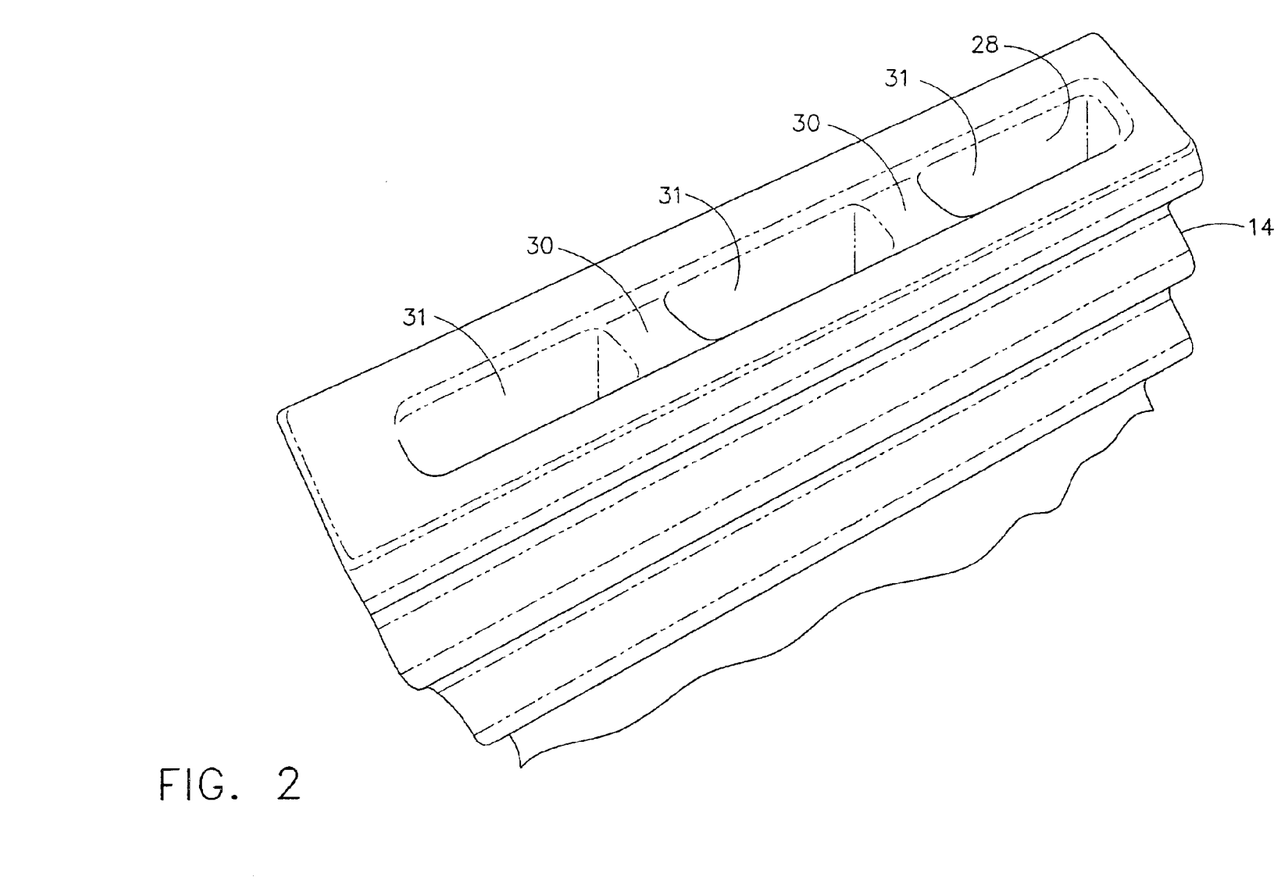
FIG. 2 is a cross-sectional view of a portion of the gas turbine engine blade shown in FIG. 1.

FIG. 1 is a perspective view of a turbine rotor blade 10 that may be used with a gas turbine engine (not shown). FIG. 2 is a perspective view of a portion of rotor blade 10. In one embodiment, a plurality of rotor blades 10 form a high-pressure turbine rotor blade stage (not shown) of the gas turbine engine. Each blade 10 includes an airfoil 12 and an integral dovetail 14 that is used for mounting airfoil 12 to a rotor disk (not shown) in a known manner. Alternatively, blades 10 may extend radially outwardly from a disk (not shown), such that a plurality of blades 10 form a blisk (not shown).

Each airfoil 12 includes a first contoured sidewall 16 and a second contoured sidewall 18. First sidewall 16 is convex and defines a suction side of airfoil 12, and second sidewall 18 is concave and defines a pressure side of airfoil 12. Sidewalls 16 and 18 are joined at a leading edge 20 and at an axially-spaced trailing edge 22 of airfoil 12. More specifically, airfoil trailing edge 22 is spaced chordwise and downstream from airfoil leading edge 20. First and second sidewalls 16 and 18, respectively, extend longitudinally or radially outward in span from a blade root 24 positioned adjacent dovetail 14, to an airfoil tip 26. In one embodiment, airfoil tip 26 includes a tip shroud (not shown) extending radially outward therefrom in a direction away from airfoil 12.

More specifically, in the exemplary embodiment, each dovetail 14 includes a radially inner surface 28, that defines a portion of at least one cooling passage 30 that extends through dovetail 14 and radially outwardly through at least a portion of airfoil 12. Dovetail 14 includes three separate cooling passages 31 that are in fluid flow communication with passages 30. Cooling passages 30 receive cooling fluid from a cooling system (not shown) during engine operation.

Figure 3:
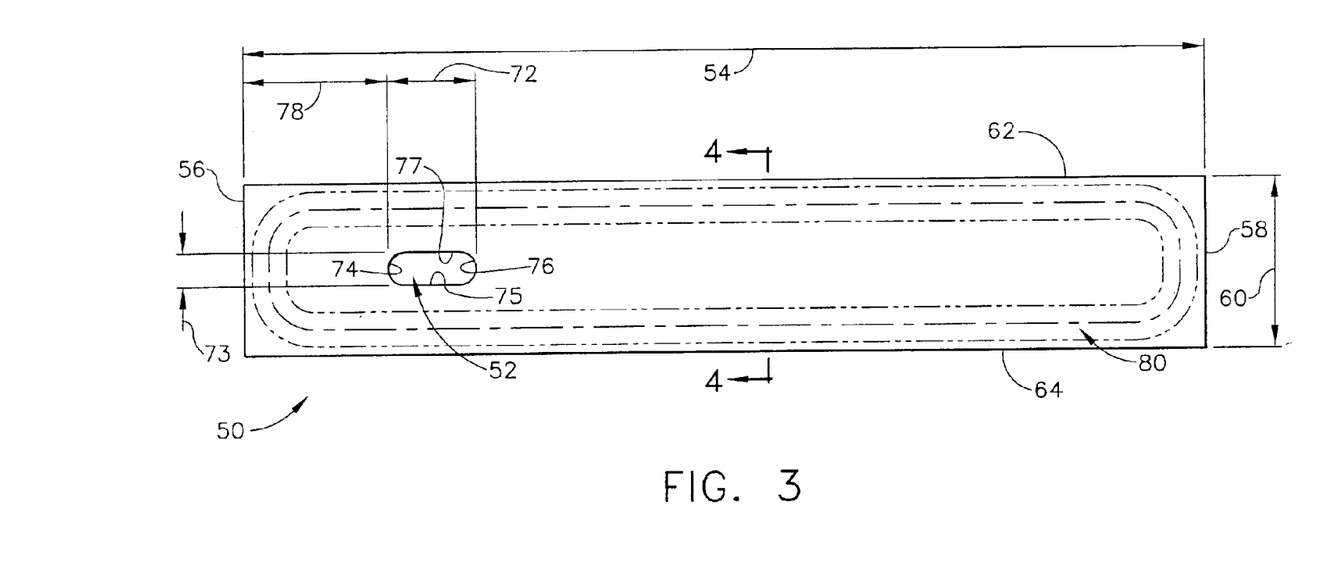
FIG. 3 is a plan view of an exemplary metering plate.
Figure 4:
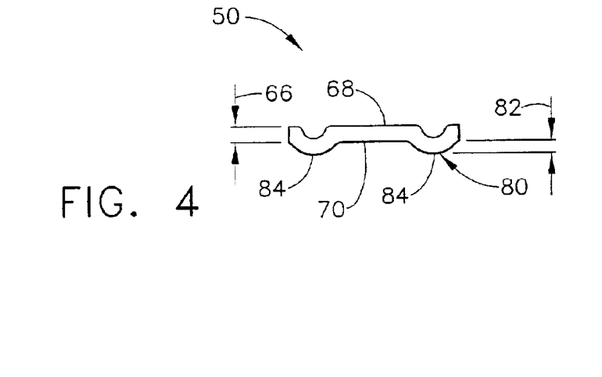
FIG. 4 is a cross-sectional view of the metering plate shown in FIG. 3 and taken along line 4—4.

FIG. 3 is a plan view of an exemplary metering plate 50 for use with rotor blade 10 (shown in FIGS. 1 and 2). FIG. 4 is a cross-sectional view of metering plate 50 taken along line 4—4. Metering plate 50 is coupled to blade dovetail radially inner surface 28 (shown in FIG. 2) and includes an opening 52 that facilitates controlling, also referred to herein as metering, fluid flow into cooling passages 30 (shown in FIG. 2). Metering plate 50 extends a length 54 measured between a first side 56 and a second side 58, and extends a width 60 measured between a third side 62 and a fourth side 64. Metering plate 50 also has a thickness 66 measured between a radially inner surface 68 and a radially outer surface 70. Opening 52 is substantially elliptical and extends between surfaces 68 and 70, and has a length 72 measured between a first side 74 and a second side 76, and a width 73 measured between a third side 75 and a fourth side 77. Alternatively, opening 52 is non-elliptical. In the exemplary embodiment, opening 52 is positioned a length 78 from metering plate first side 56. Although metering opening 52 is described and illustrated herein in the exemplary manner, it will be understood that the size, shape, and position of opening 52 will vary depending upon predetermined metering constraints and properties.

Metering plate 50 includes a projection 80 that extends outwardly from metering plate surface 70. More specifically, projection 80 extends a height 82 from surface 70 to portion 84, and is shaped complimentary to a portion of dovetail radially inner surface 28 (shown in FIG. 2) such that projection 80 is coupled to the complimentary portion of dovetail radially inner surface 28 using a resistance welding process, as described below. Although projection 80 is herein described and illustrated in the exemplary manner, it will be understood that the size, shape, and position of projection 80 will vary depending upon the size and shape of dovetail radially inner surface 28 and cooling passage 30. In one embodiment, projection 80 is stamped into metering plate 50.

Figure 5:
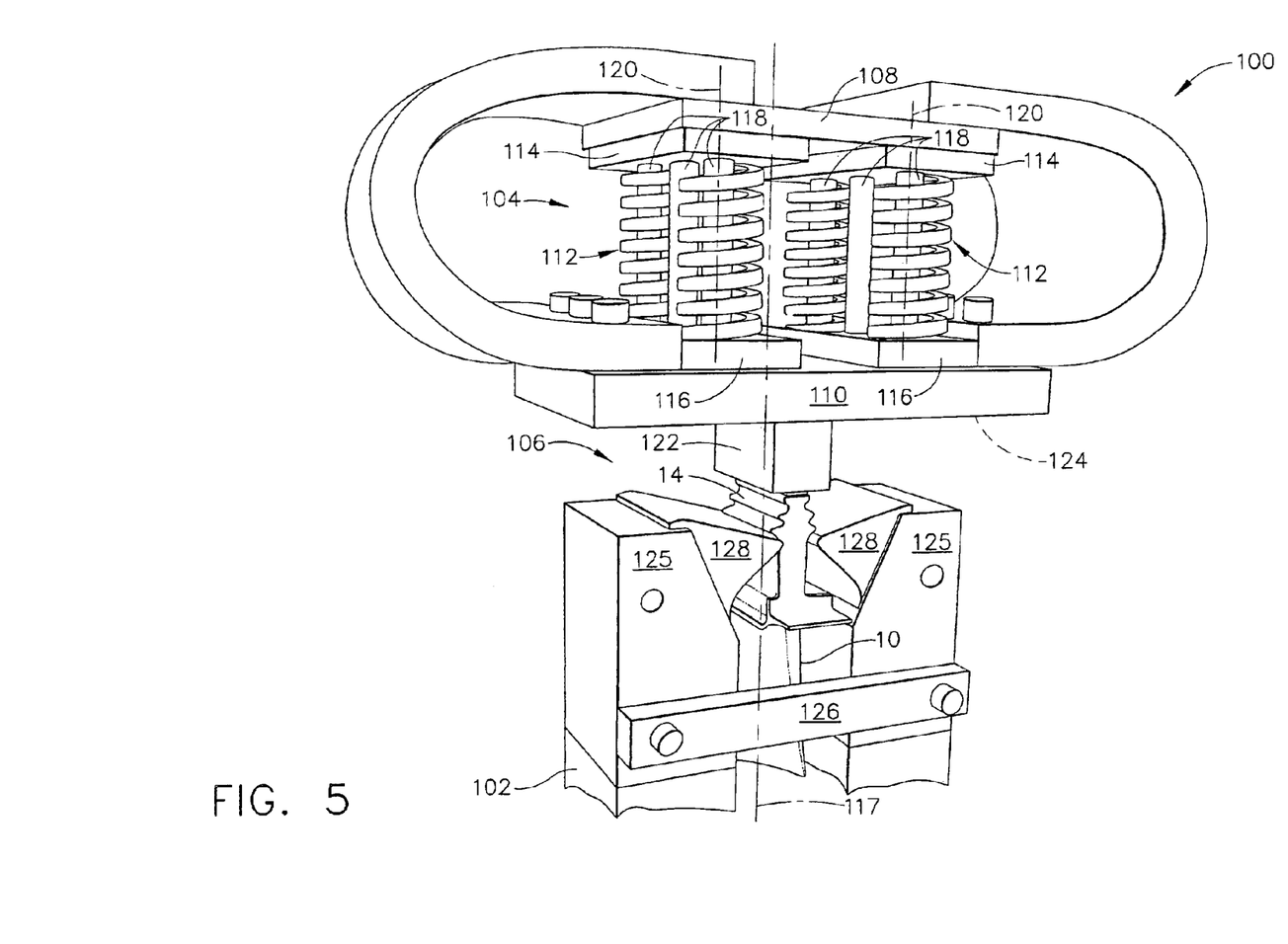
FIG. 5 is a perspective view of an exemplary resistance projection welding (RPW) system.
Figure 6:
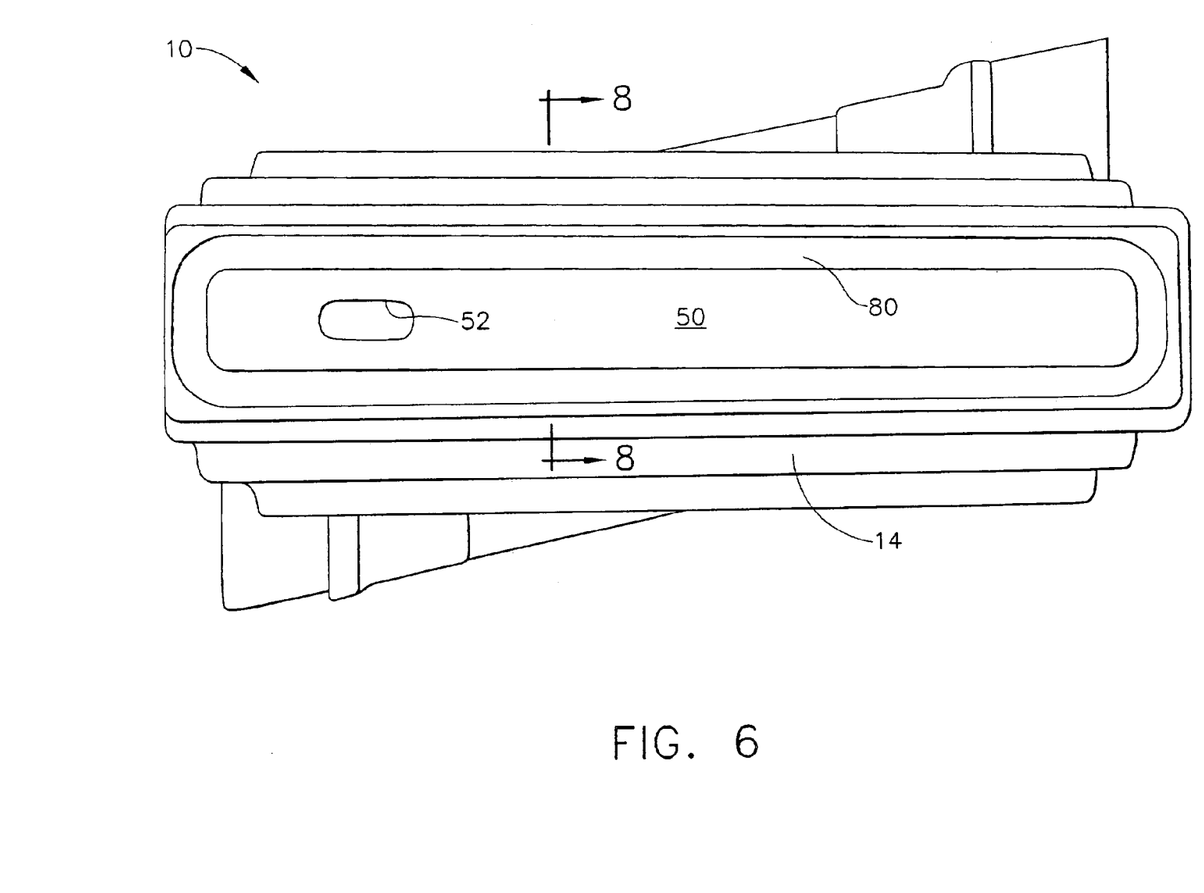
FIG. 6 is an end view of an exemplary gas turbine engine blade including a metering plate coupled thereto.
Figure 7:
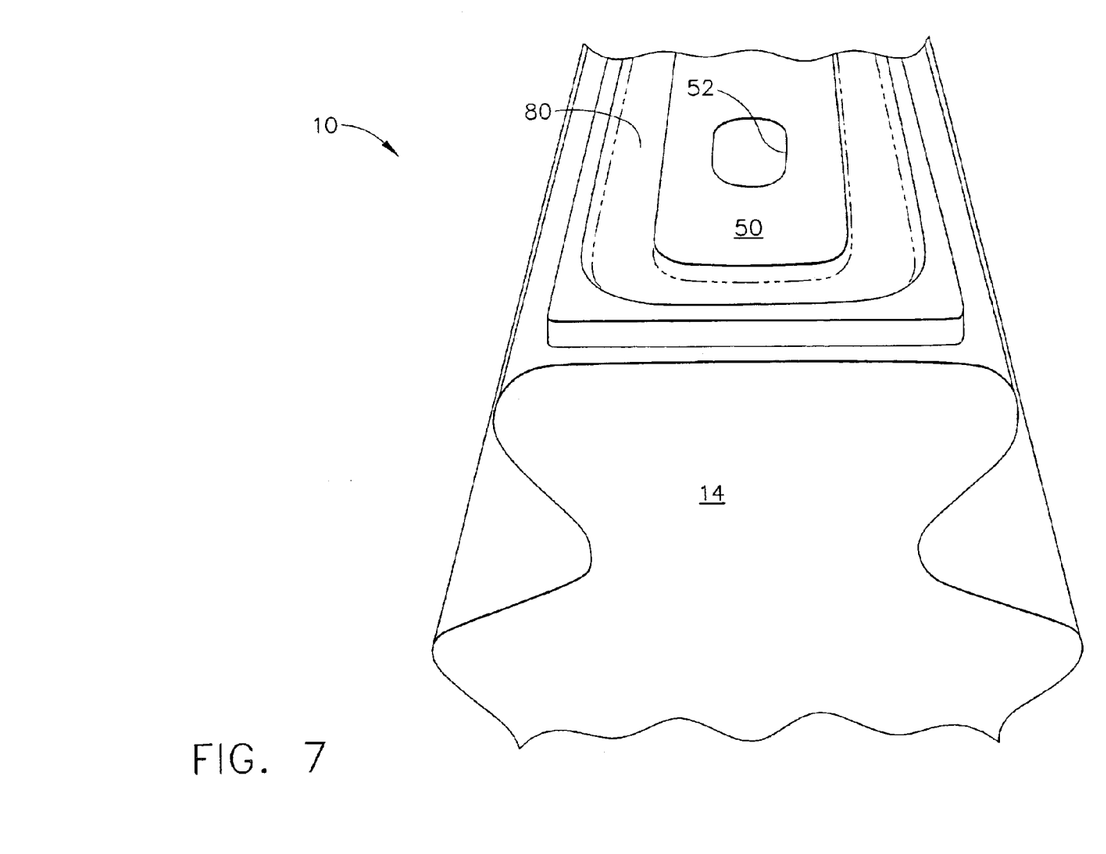
FIG. 7 is a perspective view of the gas turbine engine blade shown in FIG. 6.
Figure 8:
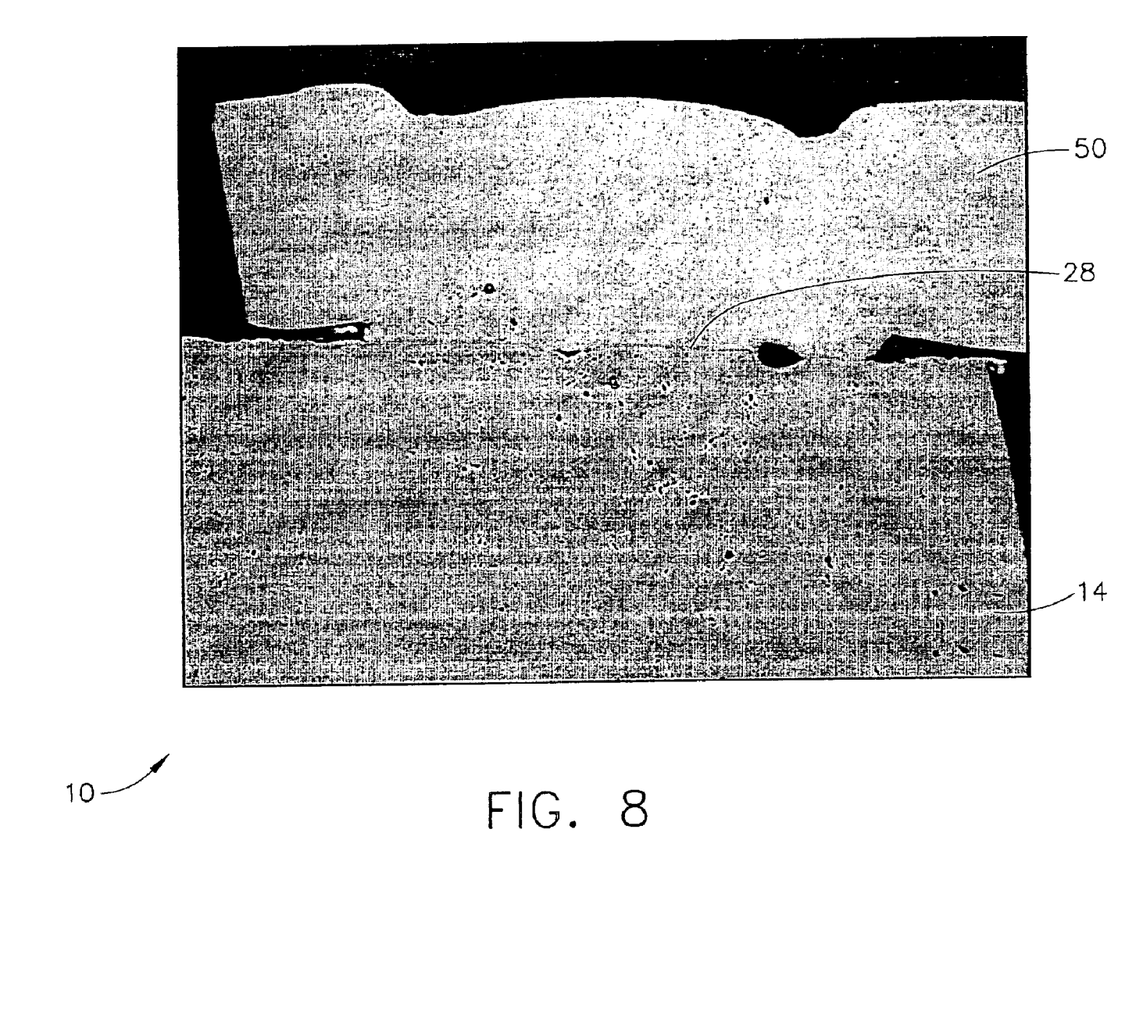
FIG. 8 is a cross-sectional view of a portion of the gas turbine engine blade shown in FIGS. 6 and 7 and taken along line 8—8.

FIG. 5 is a perspective view of an exemplary resistance projection welding (RPW) system 100 used for coupling metering plate 50 (shown in FIGS. 3 and 4) to blade 10 (shown in FIGS. 1 and 2). FIG. 6 is a perspective view of rotor blade 10 (shown in FIGS. 1 and 2) illustrating metering plate 80 (shown in FIGS. 3 and 4) coupled thereto using RPW system 100. FIG. 7 is a perspective view of a portion rotor blade 10 illustrating metering plate 80 coupled thereto using RPW system 100. FIG. 8 is a cross-sectional view of a portion of rotor blade 10 taken along line 8—8 and illustrating metering plate 80 coupled to blade 10 using RPW system 100. System 100 includes a base 102, a biasing assembly 104, a tool assembly 106, and an electrical power source (not shown).

Biasing assembly 104, tool assembly 106, and the electrical power source are coupled to base 102 in any suitable manner, for example, using threaded bolts and threaded openings. A portion of biasing assembly 104 and a portion of tool assembly 106 are electrically connected to the electrical power source. In one embodiment, the electrical power source is a 600 kVA primary rectified DC resistance power source. Biasing assembly 104 includes a first support plate 108, a second support plate 110, a plurality of biasing mechanisms 112 disposed between first support plate 108 and second support plate 110, a plurality of first biasing mechanism support plates 114, and a plurality of second biasing mechanism support plates 116. In one embodiment, biasing mechanisms 112 are a plurality of stacks of belleville washers. First support plate 108 is movably coupled to base 102 such that first support plate 108 is selectively translatable along a central longitudinal axis 117 extending through system 100 substantially perpendicularly to first support plate 108 and second support plate 110.

First biasing mechanism support plates 114 are coupled to first support plate 108 in any suitable manner, for example using threaded bolts and threaded openings. Second biasing mechanism support plates 116 are coupled to second support plate 110 in any suitable manner, for example using threaded bolts and threaded openings. First and second biasing mechanism support plates 114 and 116 each include an annular opening (not shown) extending therethrough and an annular recess (not shown). A plurality of shafts 118 are coupled to second support plate 110 and extend outwardly from second support plate 110 and substantially perpendicularly to second support plate 110. More specifically, shafts 118 are received within respective first and second biasing mechanism support plate annular openings and received within respective annular openings (not shown) within first support plate 108, such that shafts 118 extend outwardly from second support plate 110 through respective first and second biasing mechanism support plates 114 and 116 and first support plate 108. Shafts 118 are slidably engaged with respective first biasing mechanism support plates 114 and first support plate 108 such that first support plate 108 is selectively translatable along a plurality of respective central axes 120 of shafts 118 and is movable with respect to second support plate 110.

Biasing mechanisms 112 are disposed within the first and second biasing mechanism support plate annular recesses and a plurality of shafts 118 are received within biasing mechanisms 112, such that biasing mechanisms 112 extend between first support plate 108 and second support plate 110. Biasing mechanisms 112 provide biasing force to resist longitudinal movement of first support plate 108 along system central axis 117 toward second support plate 110. A welding head 122 is coupled to a bottom surface 124 of second support plate 110 in any suitable manner. In one embodiment, welding head 122 is a copper-alloy having generally good electrical and thermal conductivity. In addition, in one embodiment, welding head 122 is a low-inertia welding head which has a mass low enough to sustain a force across the welded interface even though the projection collapses rapidly during the welding process.

Tool assembly 106 includes a plurality of support members 125 fixedly coupled to base 102. Support members 125 are also fixedly coupled to each other using a connecting bar 126 that is coupled to support members 125 in any suitable manner, for example, using threaded bolts and threaded openings. Support members 125 each include a respective support electrode 128 fixedly coupled thereto that are configured to rigidly secure blade 10 therebetween during operation of system 100, and more specifically, coupling of metering plate 50 to blade dovetail 14. In an alternative embodiment, support electrodes 128 are movably coupled to support members 125 to facilitate rigidly securing blade 10 therebetween. In another alternative embodiment, support members 125 are not coupled to each other and at least one support member 125 is movably coupled to base 102 to facilitate rigidly securing blade 10 between support electrodes 128. Support electrodes 128 are formed from any electrically-conductive material that satisfies Resistance Welder Manufacturer Association (RWMA) standards.

In the exemplary embodiment, support electrodes 128 contact and support blade 10 adjacent blade root 24. However, in an alternative embodiment, support electrodes 128 contact and support blade 10 adjacent blade dovetail 14 to facilitate passing electrical current through blade 10 without damaging blade 10.

In operation, blade 10 is rigidly secured between support electrodes 128 and metering plate 50 is positioned on blade dovetail radially inner surface 28 such that projection 80 contacts surface 28 and is substantially aligned with the complimentary portion of dovetail radially inner surface 28. Using movable support plate 108, biasing assembly 104 is moved along RPW system central axis 117 toward blade 10, such that welding head 122 contacts metering plate 50 and biasing mechanisms 112 are at least partially compressed between first support plate 108 and second support plate 110. Compression of biasing mechanisms 112 transmits force to metering plate 50 via second support plate 110 and welding head 122. More specifically, welding head 122 applies force to metering plate 50 that is substantially parallel to blade dovetail radially inner surface 28, such that a predetermined, and substantially uniform, compressive pressure or force, herein referred to as welding force, is applied to metering plate 50 between surface 28 and welding head 122. In one embodiment, the welding force is between approximately 3500 and 10,000 pounds.

Electrical current is then provided to biasing assembly 104 and tool assembly 106 using the source of electrical current, such that an electrical circuit is formed between at least welding head 122, blade 10, support electrodes 128 and the source of electrical current. In one embodiment, one cycle is approximately $1/60^{th}$ of a second. More specifically, electrical current is cycled through at least welding head 122, blade 10, metering plate 50, and support electrodes 128 to generate heat from the electrical resistance of metering plate 50 and blade 10. Projections 80 concentrate the electrical current and resistance, along with the welding force, at the complimentary portion of dovetail radially inner surface 28 and at projections 80 themselves. The welding force and heat generated from the electrical resistance at least partially collapse projection 80 and coalesce metering plate 50 and blade 10 together at projection 80 and the complimentary portion of surface 28. In one embodiment, coalescence of metering plate 50 and blade 10 provides a seal between metering plate 50 and the complimentary portion of dovetail radially inner surface 28, which facilitates preventing fluid from passing between metering plate 50 and the dovetail radially inner surface 28.

A weld time of between one and three cycles using a high pulse current facilitates concentrating heat generated from the electrical resistance at the complimentary portion of dovetail radially inner surface 28 and projections 80, such that blade dovetail 14 and portions of metering plate 50 other than projection 80 do not overheat and/or substantially melt. More specifically, system 100 facilitates coalescence of metering plate 50 and dovetail radially inner surface 28 without substantial overheating, cracking, and/or melting of blade 10 and portions of metering plate 50 other than projection 80. In addition, biasing assembly 104 facilitates providing a substantially uniform welding force during cycling of electrical current through blade 10 and metering plate 50. To facilitate coalescence of metering plate 50 and blade 10, biasing assembly 104 also continues to apply welding force to metering plate 50 after projection 80 has collapsed. Furthermore, using the welding force, welding head 122 substantially restricts lateral movement of metering plate 50 during collapse of projection 80 to facilitate a predetermined alignment of metering plate 50 and dovetail radially inner surface 28.

Although system 100 is herein described in the exemplary manner, it will be understood that the particular design and properties of system 100 and the various components and assemblies of system 100 will vary according to a particular design choice chosen to facilitate coalescence of metering plate 50 and dovetail radially inner surface 28 without substantial overheating, cracking, and/or melting of blade 10 and portions of metering plate 50 other than projection 80, to facilitate providing a substantially uniform welding force, to facilitate applying welding force to metering plate 50 after projection 80 has collapsed, and to facilitate restricting lateral movement of metering plate 50 during coalescence and more specifically, during collapse of projection 80.

The above-described RPW system and blade assembly are cost-effective and highly reliable for coupling a metering plate to a rotor blade. More specifically, the methods and systems described herein facilitate coalescence of a metering plate and a rotor blade without substantial overheating, cracking, and/or melting of the blade and portions of the metering plate. In addition, the above-described methods and systems facilitate providing a substantially uniform welding force, and facilitate restricting lateral movement of the metering plate during coalescence. As a result, the methods and systems described herein facilitate reducing manufacturing costs in a cost-effective and reliable manner.

Exemplary embodiments of rotor blade assemblies and RPW systems are described above in detail. The systems and assemblies are not limited to the specific embodiments described herein, but rather, components of each assembly and system may be utilized independently and separately from other components described herein. Each system and assembly component can also be used in combination with other system and assembly components.

While the invention has been described in terms of various specific embodiments, those skilled in the art will recognize that the invention can be practiced with modification within the spirit and scope of the claims.

What is claimed is:

1. A method for fabricating a turbine engine blade, said method comprising:
   providing a resistance projection welding system;
   coupling a biasing mechanism between a first support plate and a second support plate; and
   welding a metering plate to the turbine engine blade using the resistance projection welding system such that the biasing mechanism biases the metering plate substantially axially towards the turbine engine blade during welding.

2. A method in accordance with claim 1 further comprising providing a metering plate that includes at least one projection that extends outwardly therefrom.

3. A method in accordance with claim 2 wherein providing a metering plate that includes at least one projection that extends outwardly therefrom comprises stamping the projection into the metering plate.

4. A method in accordance with claim 2 wherein welding the metering plate to the turbine engine blade comprises at least partially collapsing the projection.

5. A method in accordance with claim 1 wherein welding the metering plate to the turbine engine blade comprises cycling electrical current through the metering plate and the turbine engine blade to facilitate generating heat.

6. A method in accordance with claim 1 wherein welding the metering plate to the turbine engine blade comprises applying force to the metering plate through the biasing mechanism.

7. A method for fabricating a turbine engine blade, said method comprising:
   providing a resistance spot welding system;
   coupling a biasing mechanism between a first support plate and a second support plate; and welding a metering plate to the turbine engine blade using the resistance spot welding system such that the biasing mechanism biases the metering plate substantially axially towards the turbine engine blade during welding.

8. A method for fabricating a turbine engine blade, said method comprising:

providing a resistance seam welding system;

coupling a biasing mechanism between a first support plate and a second support plate; and welding a metering plate to the turbine engine blade using the resistance seam welding system such that the biasing mechanism biases the metering plate substantially axially towards the turbine engine blade during welding.

9. A method for coupling a metering plate to a turbine engine blade including at least one cooling passage therein, said method comprising:

providing a resistance projection welding system;

coupling a biasing mechanism between a first support plate and a second support plate; and welding the metering plate to the turbine engine blade using the resistance projection welding system such that the metering plate moves substantially axially towards the turbine engine blade during welding and at least partially covers an entrance to the at least one cooling passage.

10. A method in accordance with claim 9 wherein welding the metering plate to the turbine engine blade comprises welding the metering plate to a turbine engine rotor blade such that the cooling passage remains in flow communication with a cooling fluid source.

11. A method in accordance with claim 9 wherein welding the metering plate to the turbine engine blade comprises cycling electrical current through the metering plate and the turbine engine blade to facilitate generating heat.

12. A method in accordance with claim 9 wherein said welding the metering plate to the turbine engine blade comprises applying pressure to the metering plate to facilitate at least partially collapsing a projection extending outwardly from the metering plate.

13. A method for coupling a metering plate to a turbine engine blade including at least one cooling passage therein, said method comprising:

providing at least one of a resistance spot welding system and a resistance seam welding system;

coupling a biasing mechanism between a first support plate and a second support plate; and welding the metering plate to the turbine engine blade using at least one of the resistance spot welding system and the resistance seam welding system such that the biasing mechanism biases the metering plate substantially axially toward the turbine engine blade during welding.

14. A method for coupling a component to a turbine engine stator vane, said method comprising:

providing a resistance projection welding system;

coupling a biasing mechanism between a first support plate and a second support plate; and welding the component to the turbine engine stator vane using the resistance projection welding system such that the biasing mechanism biases the metering plate substantially axially towards the turbine engine blade during welding.

15. A method in accordance with claim 14 wherein the stator vane includes at least one cooling passage defined therein, said welding the component to the turbine engine stator vane comprises welding a metering plate to the turbine engine stator vane such that the metering plate at least partially covers an entrance to the at least one cooling passage.

16. A method in accordance with claim 14 wherein welding the component to the turbine engine stator vane comprises:

providing at least one projection extending outwardly from the component;

cycling electrical current through the component and the turbine engine stator vane to facilitate generating heat; and applying pressure to the component to facilitate at least partially collapsing the projection.

17. A method for coupling a component to a turbine engine stator vane, said method comprising:

providing at least one of a resistance spot welding system and a resistance seam welding system;

coupling a biasing mechanism between a first support plate and a second support plate; and welding the component to the turbine engine stator vane using at least one of the resistance spot welding system and the resistance seam welding system such that the biasing mechanism biases the metering plate substantially axially towards the turbine engine blade during welding.

* * * * *